United States Patent
Henrich et al.

(10) Patent No.: US 6,856,640 B2
(45) Date of Patent: Feb. 15, 2005

(54) DEVICE FOR PRODUCING LASER LIGHT

(75) Inventors: Bernhard Henrich, Kaiserslautern (DE); Andrew Robertson, Torquay (GB); Achim Nebel, Trippstadt (DE)

(73) Assignee: Lumera Laser GmbH (DE)

( * ) Notice: Subject to any disclaimer, the term of this patent is extended or adjusted under 35 U.S.C. 154(b) by 0 days.

(21) Appl. No.: 10/399,850

(22) PCT Filed: Oct. 23, 2001

(86) PCT No.: PCT/EP01/12241
§ 371 (c)(1),
(2), (4) Date: Apr. 22, 2003

(87) PCT Pub. No.: WO02/37620
PCT Pub. Date: May 10, 2002

(65) Prior Publication Data
US 2004/0085658 A1 May 6, 2004

(30) Foreign Application Priority Data
Oct. 23, 2000 (DE) .......................... 100 52 461

(51) Int. Cl.[7] ............................. H01S 3/10; H01S 3/082
(52) U.S. Cl. .......................................... 372/97; 372/21
(58) Field of Search ...................... 372/18, 21, 92–108, 372/39, 22, 62–70, 75

(56) References Cited

U.S. PATENT DOCUMENTS

| 5,054,027 A | 10/1991 | Goodberlet et al. |
| 5,278,855 A | 1/1994 | Jacobovitz-Veselka et al. |
| 5,317,577 A | 5/1994 | Urakami et al. |
| 5,345,454 A | 9/1994 | Keller |

FOREIGN PATENT DOCUMENTS

| DE | 196 42 409 A1 | 4/1997 |
| DE | 198 19 473 C2 | 11/1999 |
| DE | 199 54 109 A1 | 10/2000 |

OTHER PUBLICATIONS

Golla, D. et al., "High Power Continuous–Wave Diode–Laser–Pumped Nd: YAG Laser", Applied Physics B, vol. 58, 1994, pp. 389–392, (no month).

Sucha, G. et al., "Period doubling and quasi–periodicity in additive–pulse mode–locked lasers", Optics Letters, vol. 20, No. 17, 1995, pp. 1794–1796, (no month).

Tidwell, S.C. et al., "Scaling CW Diode–End–Pumped Nd: YAG Lasers to High Average Powers", IEEE Journal of Quantum Electronics, vol. 28, No. 4, 1992, pp. 997–1009, (no month).

Grant, R.S. et al., "Cavity configuration for coupled–cavity mode locking", Optics Communications, vol. 86, 1991, pp. 177–182, (no month).

H. G. Danielmeyer, "Low–Frequency Dynamics of Homogeneous Four–Level cw Lasers", Journal of Applied Physics, vol. 41, No. 10, Sep. 1970, pp. 4014–4018.

*Primary Examiner*—Quyen Leung
(74) *Attorney, Agent, or Firm*—Straub & Pokotylo; Michael P. Straub

(57) ABSTRACT

In a device to generate laser light, with a laser-active main resonator (2) and a coupled non-linear resonator (6), each of the two resonators (2, 6) being delimited by mirrors (8, 4; 4, 10), and one mirror (4) of the main resonator (2) being identical to a mirror (4) of the coupled non-linear resonator (6), it is provided that the non-linear resonator (6) is designed for a power loss less than 63% of the power which is coupled via the main resonator (2) and the mirror which delimits the coupled non-linear resonator (6), and the laser-active main resonator is designed so that in laser operation it has a threshold pump power which is less than one fifth, preferably less than one tenth, of the pump power which is used and using which this resonator is excited.

25 Claims, 3 Drawing Sheets

DEVICE FOR PRODUCING LASER LIGHT

The invention concerns a device to generate laser light, with a laser-active main resonator and a coupled non-linear resonator. Each of the two resonators is delimited by mirrors, and one mirror of the main resonator is identical to a mirror of the coupled non-linear resonator.

In the case of a resonator of a device to generate laser light, several modes of laser oscillation usually occur. Particularly in the case of pulsed lasers in the picosecond range, which because of the shortness of the wave train emit a very large wavelength spectrum, this can result in instabilities, since with each pulse statistically a different amplitude distribution with reference to the different modes can be received.

This can be avoided with various methods of mode locking. Mode locking means that the longitudinal modes of a laser have a fixed phase relationship, and are thus rigidly coupled to each with respect to phase. The effect of this is above all that the laser emits its energy in the form of ultra-short pulses. Depending on the laser material and the type of mode locking, these ultra-short pulses have pulse durations from about 100 ps to a few femtoseconds. The time gap from one ultra-short pulse to the next pulse corresponds to the resonator cycle time.

The various known methods can be divided into active and passive methods. The invention is explained below exclusively on the basis of passive methods.

In the case of passive mode locking, a pulse which cycles in the resonator itself modulates its amplitude. Active components for amplitude or frequency modulation can then be omitted.

For passive mode locking, a non-linear element, the effect of which can be most simply understood on the basis of the saturable absorption, is used which the absorption is saturated at high light intensities and the transmission is thus increased compared with low light intensities. In this way preferably a state of higher light intensity is forced. This is achieved above all with the resulting shortening of a pulse, which is thus set as a reproducible physical state. The saturated absorption can be implemented, for instance, using semiconductor components, in which case the optical excitation enables elecrtons to switch completely from the valence band to the conduction band with suitably high intensity.

However, what is also particularly important here is the non-linear phase shift resulting from the mutual effect of the laser light and a medium which has a non-linear index of refraction, particularly because of the Kerr effect. Self phase modulation of the light occurs if the Kerr non-linearity causes a time-dependent phase shift, for instance in an optical fibre. Additionally, self-focusing of the laser light is possible if the Kerr non-linearity causes a location-dependent phase shift. Such behaviour can be described theoretically analogously to the saturable absorber which is given above, by a so-called artificial saturable absorber.

Physically, it makes a big difference whether the process is resonant or non-resonant. Resonant processes run more slowly than non-resonant ones. The optical Kerr non-linearity effect which is given above as an example is a non-resonant process of only a few femtoseconds rise time. Thus fast modulation is possible, so that essentially no recovery time has to be taken into account.

Because of the non-resonant mutual effect, mode locking is possible in particular over a wide wavelength range. Above all in the case of the Kerr process with an optical fibre, the absorption is also very low, and can be increased as required by providing a suitable length of fibre. In this way, simple adjustment of the lasers by suitable choice of the parameters of the non-linear resonator becomes possible, so that mode locking is achievable with different laser systems and lasers with different output data, particularly maximum output power, pulse duration and repetition rate of the pulses.

For such mode locking, an auxiliary resonator to which a non-linear resonator is coupled is usually used, as described, for instance, in U.S. Pat. No. 5,054,027. The coupling is usually via an interferometer. However, this causes mode locking to become expensive and liable to faults. Above all, because of the necessary precise positioning of an interferometer to fractions of a wavelength, specially stable construction is required.

However, the specified US patent specification also shows as an alternative a simpler arrangement, in which the mirror of the main resonator, which is opposite the mirror to extract the generated laser light, is equal to one of the mirrors of the non-linear resonator. To transmit the light from the main resonator into the non-linear resonator, this mirror is partially translucent, with a transmission of 5–35%.

However, some tests have shown that with the specified values no permanently stable mode operation was possible. This embodiment is probably given in the US patent specification rather as an idea, the practical implementation of which is probably not immediately possible. One therefore continues to depend on the known interferometric methods, with the stated disadvantages.

In this connection, constructions with Fabry-Perot resonators or Michelson interferometers are known. For the special configurations, reference is made to the extensive literature.

A further disadvantage, which limits these methods to systems with comparatively low output power of less than 7 W, is the necessity of coupling the laser light into a single-mode optical fibre, which has only a short lifetime with high coupled powers.

On the other hand, there is a high requirement for mode-locked laser beam sources, which supply ultra-short pulses of less than 20 ps into the femtosecond range. As well as metrology for capturing very precise time flows, above all projection of pictures, particularly video pictures, using lasers should be mentioned here. Above all, there is a requirement because it is desirable to make large picture television technology possible for the consumer field.

A laser supplies a sufficiently high light density for this purpose. However, irrespective of the imaging technology which is used, because of the high coherence of laser light undesired glitter effects occur. They can be effectively avoided by a large spectral width or a small coherence length. With ultra-short pulses, this property is given from the outset.

The following features are therefore extremely desirable for a laser source which can be used in this way:

a high average power of a few watts or more;
 a short pulse duration of the laser pulses, of less than 20 ps;
 a high repetition rate of the laser pulses, of more than 40 MHz;
 a good beam quality, with diffraction limited as far as possible;
 as simple and compact construction as possible;
 use of a mode locking method which can be used for different laser materials and emission wavelength ranges;

robustness against external interference and adjustments of the parameters of the laser or resonator; and mode locking made possible for different repetition rates, without significant restriction.

Because of the above-mentioned disadvantages, it cannot be expected that all these aims can be achieved simply. This invention was therefore based on a significantly simpler problem, which fulfils the essential requirements for increased stability and robust construction.

The object of the invention is to create a device which has robust construction and can be operated stably over time, to generate a pulsed laser beam using mode locking.

On the basis of the prior art as stated in the introduction, the object is achieved in that the non-linear resonator is designed for a power loss less than 63% of the power which is coupled via the main resonator and the mirror which delimits the non-linear resonator. Additionally, the laser-active main resonator must be designed so that in laser operation it has a threshold pump power which is less than one fifth, preferably less than one tenth, of the pump power which is used and using which the main resonator is excited.

The ratio of the pump power in laser operation and the threshold pump power is the threshold magnification. The threshold magnification can be determined very easily from the frequency of the relaxation oscillations, i.e. the frequency with which the output power oscillates around the equilibrium position, and the total losses of the main resonator.

H. G. Danielmeyer, "Low-frequency dynamics of homogeneous four-level-cw lasers", Journal of Applied Physics 41, (1970) 4014 applies:

$$r=1+4\pi^2 f_R^2 \tau_{sp} T_R/(2\alpha_r)$$

where r is the threshold magnification, $f_R$ is the frequency of the relaxation oscillations, $2\alpha_r$ is the total losses in the main resonator, $T_R$ is the resonator cycle time, and $\tau_{sp}$ is the fluorescence lifetime of the upper laser level.

As explained above, tests with the construction which is known from U.S. Pat. No. 5,054,027, with a main resonator and a coupled non-linear resonator, each of the two resonators being delimited by mirrors and one mirror of the main resonator being identical to a mirror of the coupled non-linear resonator, have shown no success with reference to the achievable stability.

On the other hand, it would be expected that this construction would allow a higher mechanical stability than with the known constructions with interferometers, with which in any case a positioning precision of fractions of wavelengths is required.

However, it has been found unexpectedly with a special test construction that even if the transmission of the common mirror of the main resonator and non-linear resonator was less than 5%, and therefore quite different from the teaching of the US patent specification, stable mode-locked laser operation became possible. Further consideration and tests, as is shown in more detail below, have led to the conclusion that the essential feature which allows robust construction with stable mode-locked laser operation is not the transmission of the mirror but exclusively conformity to the specified upper limit of 63% for the power loss in the non-linear resonator, and that the laser-active main resonator in laser operation has a threshold pump power which is less than one fifth, preferably less than one tenth, of the pump power which is used and using which the laser-active main resonator is excited.

It was also completely unexpected that the above-mentioned desirable properties were achieved completely unproblematically on the basis of the invention, and in particular even including the extensions which are presented below.

In an advantageous extension of the invention, it is provided that the mirror which delimits both the main resonator and the non-linear resonator has a transmission which is less than half, and in particular less than ⅓, of the transmission of the extraction mirror of the main resonator.

The basis for this extension is that as little power as possible should be coupled into the non-linear resonator. If the non-linear medium in the resonator is, for instance, an optical fibre, this could be destroyed by too much power being coupled into this medium. This then restricts the design of the laser for high average output power.

As can be seen below from calculations which are explained in detail, the stability criterion according to the invention is almost independent of the transmission of the medium between the main resonator and the non-linear resonator. On the basis of the invention, therefore, the power in the non-linear resonator can be kept almost arbitrarily small, which in turn has the consequence that the average output power can be increased because of the lower load on the non-linear medium.

In this connection, it is particularly advantageous if the mirror which delimits both the main resonator and the non-linear resonator has a transmission less than or equal to 5%. This is a result which could not be expected at all on the basis of the prior art quoted above.

According to another preferred extension, it is provided that the non-linear resonator has a medium with a non-linear index of refraction. According to the invention it was provided, as shown, that the losses in the non-linear resonator should be as small as possible. For this purpose it is more advantageous to use a physical process which is not essentially based on absorption, such as, in particular, mode locking via the non-linear index of refraction.

In a preferred extension, it is provided that the medium with non-linear index of refraction is at least partly in the form of the core of an optical fibre.

In this connection, the advantages of an optical fibre have been explained above in more detail. However, what should be emphasised in particular here is the improved capability of the medium for adjustment to the predetermined conditions of the laser with an optical fibre, since the phase modulation and power can be set separately via the choice of the length and core material and/or doping.

Above all, the losses are reduced in a preferred extension of the invention, in which at least one end of the optical fibre has an anti-reflection coating.

In another preferred extension of the invention, it is provided that a mirror which delimits the non-linear resonator is in the form of a mirrored end surface of the optical fibre. In this way the construction becomes significantly simpler and less critical. In another arrangement, with a large mirror of normal size, it would have been necessary to provide a lens to focus on the core, which would require firstly an additional component and secondly a certain precision of adjustment of the focus on the core. This precision could be destroyed by an impact on the laser if special actions were not taken to prevent it. Such impacts cannot be excluded if a laser of the stated type is used in a large projection television set at home or if it is used commercially and transported from event to event.

In the following advantageous extension of the invention, a selection is made with respect to the mirror which is created by mirroring the optical fibre end. This is characterized in that only the mirror which delimits the non-linear resonator and is opposite the mirror which is identical to that of the main resonator is in the form of a mirrored end surface of the optical fibre.

Because the optical fibre is only mirrored on one side and that side of the fibre which faces the main resonator remains free, the above-mentioned advantages which result from the mirroring of the optical fibre end are obtained, but at the other end lenses, optical systems or similar can be housed, allowing better coupling into the optical fibre, to reduce the losses below the limit which is provided according to the invention.

In an advantageous extension of the invention, a lens for coupling light into the optical fibre is provided, and one side of it is mirrored as a mirror for the main resonator. This not only saves components, but also increases the stability, since the gap from mirror to lens automatically remains constant.

In a preferred extension of the invention, it is provided that a mirror which delimits the non-linear resonator, and is not identical to the mirror of the main resonator, has a surface which is curved concavely in the direction of the interior of the resonator, and the focal distance of which is in particular less than three times and in particular less than twice the resonator length of the non-linear resonator.

In experiments, it was established that in this way the stability of the intensity of the laser light could be significantly increased. This would not have been expected from the outset, because the test construction also had a lens between the mirror and the optical fibre. It would have been expected that instead of the stated concave mirror a flat mirror could be used, if the focal distance of the otherwise concave mirror surface had been taken into account in the case of that of the lens. However, this assumption was not confirmed experimentally. On the contrary, with a concave mirror surface it has been found that the precision of adjustment was improved significantly, which then has a favourable effect on stability.

Another advantageous extension of the invention is characterized in that between the outer mirrors of the main resonator or non-linear resonator further mirrors are provided to fold the light path, at least one of them being provided to couple in the pump light. With this extension, above all, the compactness and simplicity of the construction are improved.

According to another preferred extension, it is provided that the laser-active main resonator is in a form with a lasing medium between the mirrors as a laser, for which two optical elements, particularly two mirrors with a curvature and a gap to the lasing medium are provided, on which basis the laser radiation can be emitted with a diffraction measuring number $M^2<2$. Such optical elements can be mirrors or lenses. The definition of the diffraction measuring number not only allows output beams of low divergence, but also makes specially good coupling into the non-linear medium possible. In this connection, the upper limit of 2 has been shown to be specially favourable. Additionally, providing two mirrors to achieve a low diffraction measuring number is a specially simple action with which robust construction can easily be achieved. This teaching differs from known actions in the case of high-powered lasers, where large diffraction measuring numbers are implemented.

Further advantages and special features of the invention are given by the following presentation of embodiments with reference to the attached drawings.

Figure 5:
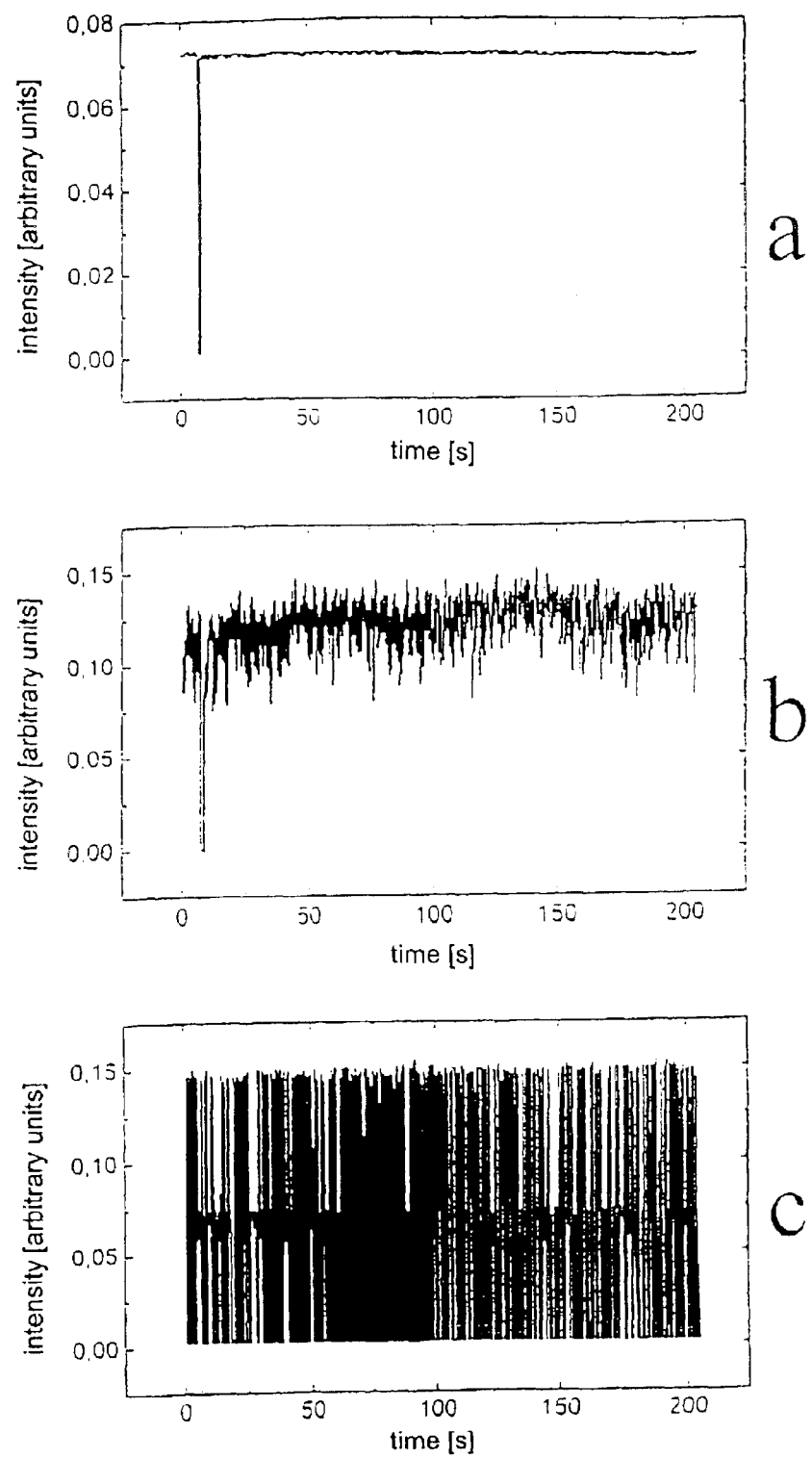

FIGS. 5a, b, c show various stability measurements for different losses in the non-linear resonator.

The following embodiments concern devices with which mode locking methods are used.

The lasers which are shown are designed for ultra-short pulses with simultaneously high average power and high repetition rate. The output power and pulse duration can essentially be adjusted and optimised independently of each other.

With the mode locking method which is used, the stability of the laser is also sufficiently high, so that the laser system does not have to be actively stabilised for length.

Figure 1:
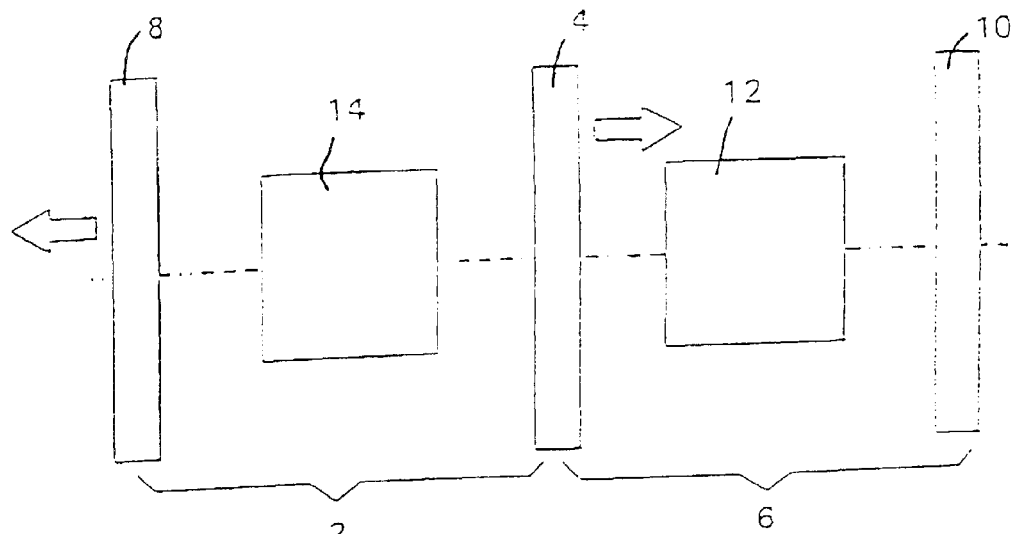
FIG. 1 shows a block diagram to explain the principle on which the invention is based.

In the schematic example of FIG. 1, a main resonator 2, which is connected via a mirror 4 of low transmission to a non-linear resonator 6, can be seen. With the mirrors 8 and 10, in connection with the mirror 4 in each case, two Fabry-Perot resonators are constructed. The mirror 8 is also designed as an extraction mirror with a suitably chosen transmission. Contrary to other known embodiments of "APM" (additive pulse mode locking) lasers, in the case of the device of FIG. 1 the extraction from the main resonator is distributed to multiple extraction mirrors 8 and 4. The degree of extraction of these extraction mirrors can be adjusted independently of each other, so that it is possible even with constant pump power to optimise the output power and the pulse duration of the laser.

By changing the degree of extraction of mirror 8, the usable output power can be varied. By choosing the degree of extraction of mirror 4, the power which is injected into the coupled non-linear resonator is adjusted. Since the resulting pulse duration depends on the power of the radiation in the coupled resonator, the pulse duration can be varied by changing the degree of extraction of mirror 4, i.e. changing the quality of the coupled resonator. Choosing two extraction mirrors simplifies the resonator construction further, since components such as a half-wave plate and a polarisation beam divider, such as are known from the prior art for coupling non-linear resonators, are also omitted. Additionally, the mode locking mechanism for devices such as are shown schematically in FIG. 1 is completely independent of the polarisation of the laser radiation.

The high passive stability of this method is achieved by minimising the losses in the non-linear resonator. In all previously known constructions, the coupled resonator had low quality with high losses.

On the other hand, with the mode locking method which is used in FIG. 1, the losses in the coupled resonator are reduced to a minimum. This means that the transmission of mirror 4 can be chosen to be sufficiently small, in particular typically less than 5%. It is thus possible to achieve that even with length changes of several micrometers, typically 4 to 6 micrometers, stable pulse operation is possible. However, if the transmission of mirror 4 is too low, ultra-short pulses no longer occur, because then the power which is coupled back into the laser becomes too low.

If the phase position of the resonators relative to each other is changed, the high quality of the coupled non-linear resonator 6 results in strong intensity fluctuations in the coupled resonator. The intensity fluctuations cause a large change of the self phase modulation, i.e. the non-linear phase in the coupled resonator. This change of the non-linear phase can compensate for the change to the linear phase within a large range of several n, so that design interference in the main resonator is still ensured. For this reason, with the construction which is shown and the mode locking method which is used, stable mode-locked operation of the laser is possible without active stabilisation.

To characterise the losses in an optical resonator of length L, the following three magnitudes are useful:

the fineness F, the loss coefficient $\alpha_r$, and the photon lifetime $\tau_p = 1/c \cdot \alpha_r$).

The fineness F is defined as usual as the ratio of the frequency interval to the spectral width of the modes.

The losses in optical resonators are essentially caused by absorption, scattering in the optical components and losses because of partially reflecting mirrors. In the coupled non-linear resonator 6, further loss sources such as uncoated fibre end surfaces and losses which result from imperfect mode adjustment of the laser light to the mode of the waveguide of the optical fibre can be added.

Losses $V_F$ because of the optical fibre can be described by the transmission at the single pass. The transmission $T_F$ is the ratio of the laser power before the fibre to the laser power after the fibre, i.e. the losses can be expressed by $V_F = 1 - T_F$. In the experimentally operated embodiments, the transmission $T_F$ was typically around 75% to 80%. The losses $V_F$ because of the optical fibre at a single pass were correspondingly 20% to 25%.

On a single cycle through the resonator of length L, the intensity of the wave is reduced by the factor $(1 - R_{TOTAL})$, where:

$$R_{total} = \exp(-2 \cdot \alpha_r \cdot L)$$

The total loss coefficient $\alpha_r$ is therefore:

$$\alpha_r = \frac{1}{2L} \ln\left(\frac{1}{R_{total}}\right) = \frac{1}{2L} \ln\left(\frac{1}{1 - V_{total}}\right)$$

where $R_{total} + V_{total} = 1$, if $V_{total}$ is the total loss factor of a cycle.

To ensure the mechanism which is used here to compensate for a change of the linear phase by the non-linear phase, the light must still be able to interact with itself after one cycle in the coupled resonator, i.e. it must not be weakened too much by the losses in the coupled resonator. The condition is thus that the photon lifetime $\tau_p = 1/(c \cdot \alpha_r)$ must be greater than the resonator cycle time $\tau_r = 2L/c$. The following then applies:

$$\tau_p \tau_r$$

If the above conditions are inserted into the inequality, the result is:

$$1/\ln(1/R_{total}) < 1 \Leftrightarrow R_{total} > 1/e \Leftrightarrow V_{total} < (1 - 1/e) \approx 0.63$$

The total losses in the coupled resonator should therefore be less than 63%, to make the desired stable mode-locked operation of the laser possible passively, without active stabilisation. This agrees with experimental results, as is demonstrated later.

To achieve this high quality in the coupled resonator, further actions can be taken in addition to the choice of a high reflectance of the extraction mirror 4. For instance, the coupling efficiency of the laser radiation into the medium 12 can, if the medium 12 is an optical fibre, be maximised by mode adjustment of the laser mode to the mode of the waveguide by suitable choice of a lens, which focuses the radiation into the optical fibre.

Such mode adjustment should also be carried out for the radiation which is fed back from the highly reflective mirror 10 of the non-linear resonator 6 into the stated optical fibre for, for instance, the non-linear medium. In particular, it has been shown that specially good mode adjustment and thus optimisation of the coupling efficiency and quality of the resonator are achieved if, instead of a plane highly reflective mirror 10, a mirror with a plano-concave surface and a focal distance which is greater than the resonator length of the non-linear resonator 6 is used. In particular, results with a radius of curvature of R=-2 m with a resonator length of approximately two metres have shown good results. In particular, the adjustment sensitivity of this mirror 10 is then significantly reduced. Of course, as an alternative to a separate mirror 10, the end surface of an optical fibre which is used as a non-linear medium can be mirrored.

If the construction of FIG. 1 is compared with those which are known from the prior art, it can be seen that the number of components is significantly reduced with the mode locking method which is used. Additionally, this type of mode locking ensures stable operation which depends little on the settings of the laser and resonator parameters. In spite of the interferometric construction, mode-locked operation is insensitive to mechanical faults.

Figure 2:
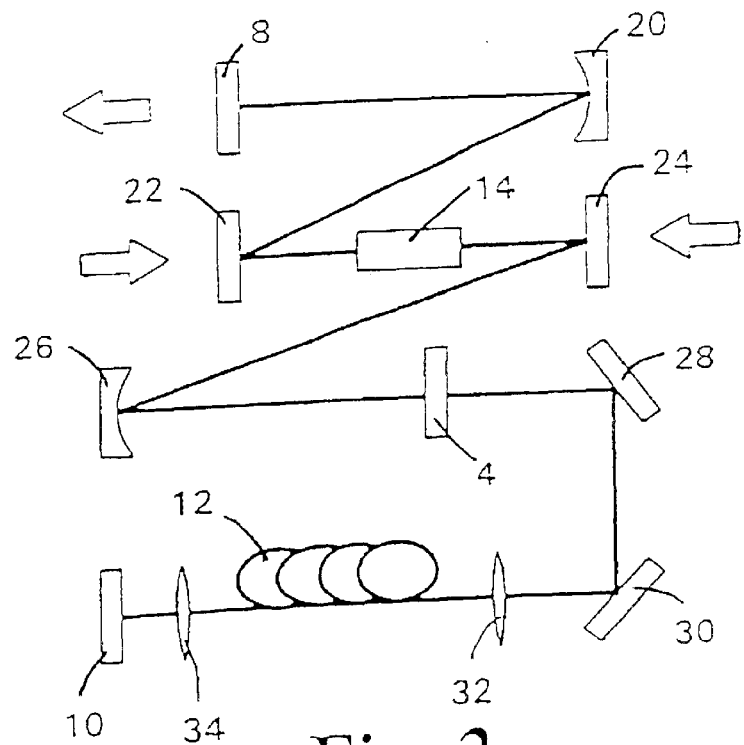
FIG. 2 shows a schematic drawing for the practical construction of an embodiment.

A construction to generate continuously mode-locked coherent radiation is presented in more detail on the basis of a device according to FIG. 2, which was constructed in the laboratory and on which measurements were carried out. The mirrors 8, 4 and 10 have the same meanings as in FIG. 1.

The laser crystal 14 in the main resonator 2 consisted of Nd:YVO$_4$. The main resonator was constructed with the mirrors 8, 20, 22, 24, 26 and 4. The pump radiation from laser diodes was coupled in according to the arrows which are shown above mirrors 22 and 24.

Mirrors 20 to 26 are highly reflective for the emission wavelength of the Nd:YVO$_4$ laser of 1064 nm. Mirrors 22 and 24 also had a high transmission for light of the wavelength of the pump laser diodes of 808 nm, and were given an anti-reflection coating for 808 nm on the back.

With mirrors 8 and 4, the extraction mirrors described above are implemented with different transmission values for 1064 nm. For instance, mirror 8 had a transmission of 9% and mirror 4 had a transmission of 3%.

Both mirrors were given an anti-reflection coating for 1064 nm on the back, and were vacuum deposited onto a substrate with a wedge angle of 0.5°, to prevent undesired feedback into the resonators. Likewise, the Nd:YVO$_4$ crystal was given an anti-reflection coating for 1064 nm and 808 nm.

The radii of curvature of mirrors 20 and 26 and the distances of the resonator mirrors 8 and 4 were chosen so that the radiation radius of the resonator mode in the Nd:YVO$_4$ crystal was adapted to the radiation radius of the pump radiation for an emission of the laser radiation with a diffraction measuring number $M^2 < 1.2$. The resonator from mirror 8 to mirror 4 had a length of about 94 cm, so that a repetition rate of the laser pulses of 160 MHz was achieved. Mirrors 20 and 26 had radii of curvature of −500 mm. All other resonator mirrors had plane surfaces and therefore a radius of curvature of ∞.

The coupled non-linear resonator extends from mirror 4 via the deviating mirrors 28 and 30 to mirror 10. In the coupled resonator, there is an optical fibre as a non-linear medium 12 with the geometrical length of 70 cm. The length of the coupled resonator thus corresponded to twice the length of the main resonator, i.e. 1.88 m. The length is calculated by the known method from the optical length of the optical fibre of dimension 0.7 m×1.45, the index of refraction of n=1.45 and the geometrical distances of the mirrors.

As the optical fibre, a polarisation-containing optical fibre with a mode field diameter of 7.2 μm and a numerical aperture of NA=0.11 was used. This fibre had a V number of 2.05 for λ=1064 nm, and thus represented a single-mode optical fibre for the wavelength of 1064 nm. The coupling of the laser light into the fibre and the collimation of the laser light behind the fibre were carried out with lenses 32 and 34. The lens 32 can also be, in particular, plane and mirrored on the side which faces the main resonator 14, so that the mirrored surface acts as a resonator mirror instead of mirror 4.

After reflection at mirror 10, the laser light returns via components 34, 12, 32, 30, 28 to the extraction mirror 4, and is coupled back into the main resonator 2 again.

To adjust the length of the coupled resonator to the length of the main resonator, mirror 10 was fixed to an X translation table, using which it was possible to adjust the length with a precision of typically 10 μm. For fine adjustment of the resonator length, mirror 10 was additionally fixed to a piezo-electrical adjustment element, using which the resonator length could be adjusted to a precision within nanometers.

The pump power through two laser diodes which were coupled in the crystal 14 via mirrors 22, 24 had a value of 2×12 W=24 W. The laser then, in operation without a coupled resonator, showed an output power of 8.7 W behind mirror 8. With total losses in the main resonator of 10%, the laser in laser operation had a threshold magnification of r 34.6. The threshold pump power is thus 1/34.6 of the pump power which is used and with which this main resonator was excited. With a coupled non-linear resonator, the output power behind mirror 8 was 9.3 W higher.

This laser emitted ultra-short pulses of a pulse duration of 6.8 ps and a spectral width of 60 GHz. To determine the width, a $sech^2$-shaped intensity course was assumed, a curve which fitted the observed pulse course excellently. The laser showed itself to be above all insensitive to changes to the resonator length, which could be detuned continuously over a range of several micrometers, that is a phase change of several n, without the mode-locked operation of the laser being interrupted.

Figure 3:
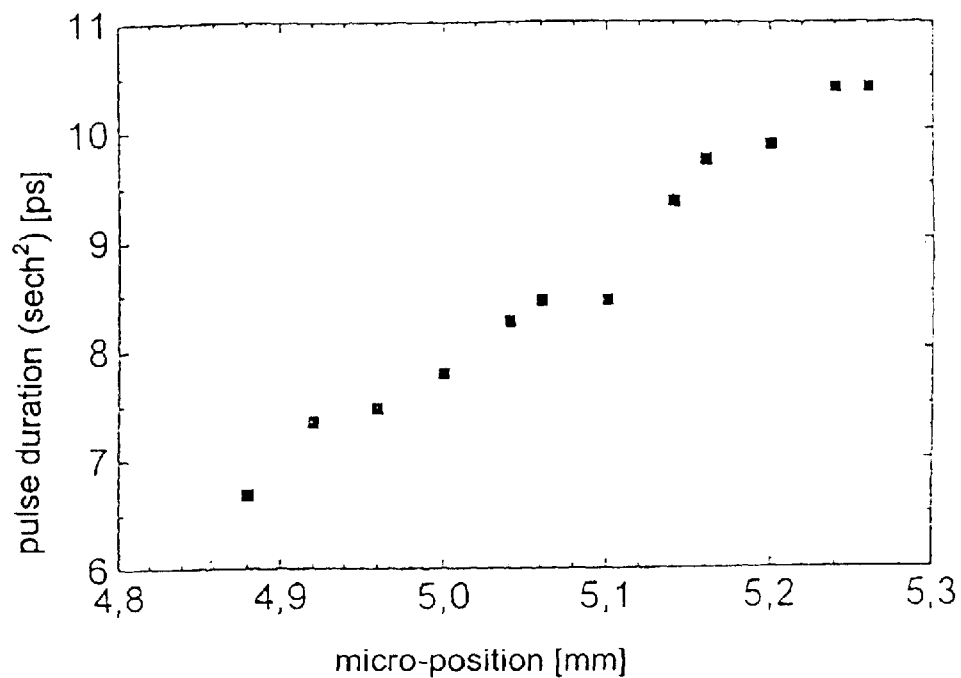
FIG. 3 shows measured values for a pulse duration depending on a mirror position.

The pulse duration of the laser pulses could be adjusted in particular by the change of the resonator length of the non-linear resonator 6. For this purpose, mirror 10 was displaced using the X translation table in the direction of the resonator axis over a length range of almost 500 μm. In FIG. 3, the pulse duration is shown as a function of the micrometer position, that is of the length detuning. It can clearly be seen that in spite of large length changes, the pulse duration changed only in a range of 6.7 ps to 10.5 ps.

If the resonator is extended over the micrometer position of 5.26 mm which is applied in FIG. 3, the laser remains mode locked. However, an additional narrow peak then appears in the spectrum, in addition to the mode-locked spectrum. The laser then emits ultra-short pulses over a continuous background. Shortening the coupled resonator under the micrometer position of 4.8 mm which is shown on the ordinate in FIG. 3 resulted in emission of a sequence of mode-locked pulses, which was additionally low-frequency modulated, that is the so-called relaxation oscillation occurred. The frequency with this laser system was about 400 kHz, with a repetition rate of 160 MHz.

In particular, as explained above, the long-term stability of the laser is particularly important. To determine it, the generated laser beam was also frequency doubled, and both the fundamental and the frequency-doubled radiation of the laser were measured using a photodiode. Because of the quadratic dependency of the peak power of the second harmonic, frequency-doubled radiation is specially sensitive to changes of the pulse duration of the laser, so that the second harmonic reacts specially critically to instability.

All measurements showed stable long-term operation of this laser system over three hours, in both the fundamental radiation and the second harmonic, although the laser was not actively stabilised electronically. The output power of the laser showed a variance of 0.6% in the fundamental and 0.4% in the second harmonic.

Figure 4:
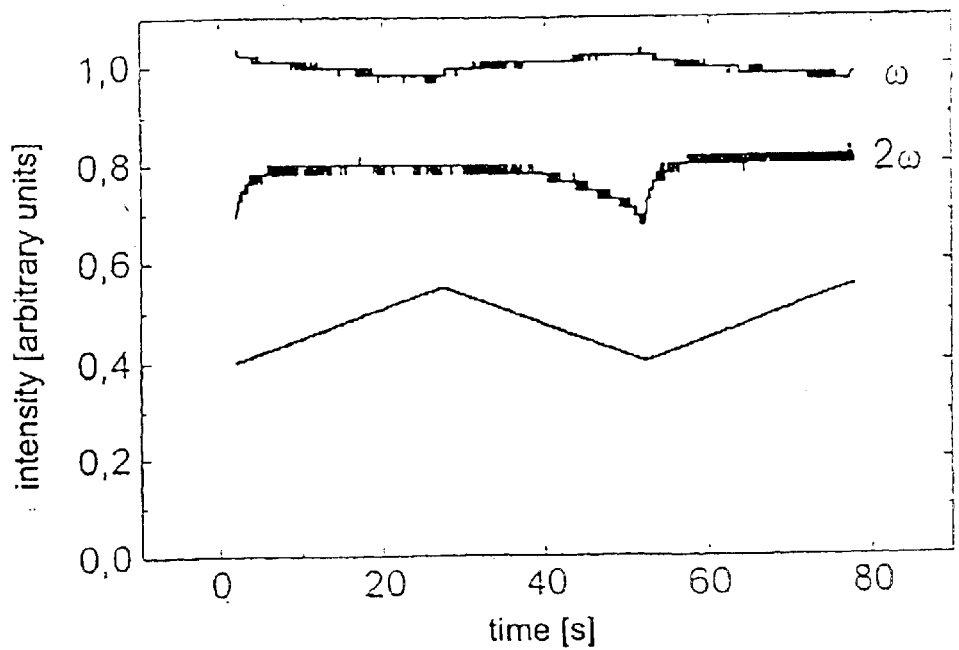
FIG. 4 shows stability measurements on an $Nd:YVO_4$ laser with a change of the resonator length.

For stability, the measurement which is shown in FIG. 4, of the dependency of the average power of the fundamental and the second harmonic of the laser as a function of the resonator length detuning of the coupled resonator using a piezo adjustment element, is also important. In a test, a triangular voltage with a frequency of 0.02 Hz and a maximum range of 15V was applied to the piezo element (PI 840.10, 15 μm/150V). Via this voltage, a maximum change of the resonator length of 2.25 μm was achieved. The bottom curve in FIG. 4 shows the voltage ramp, the top curve shows the average output power, and the middle curve shows the second harmonic of the laser. It can clearly be seen that the signal of the second harmonic hardly changes, in spite of the resonator length change by over 2 μm. The figure shows that with this construction and the mode locking method which is used, stable mode-locked operation of the laser is possible without active (electronic) stabilisation.

In a further experiment, the output power of the laser was increased. For this purpose, the pump power was increased by choosing other, more powerful laser diodes, and a different $Nd:YVO_4$ crystal was used. The pump power was about 2×24 W=48 W. The output power in continuous operation then rose to 16 W. With total losses in the main resonator of 17%, this laser showed a threshold magnification of r=8.7. The threshold pump power is thus 1/8.7 of the pump power which is used, and with which this main resonator was excited. The output power in mode-locked operation even rose to 18.3 W. Both powers were measured behind the mirror 8 according to FIG. 2.

The laser continued to emit ultra-short pulses, with a pulse duration of 6.7 ps and a spectral width of 60 GHz. The peak power of this laser was then 17.1 kW, and thus sufficiently large to be able to operate optically non-linear frequency conversions in an optical parametric oscillator, or generation of higher harmonics, or total frequency mixing, with the highest efficiency.

The presented measurements show that with this construction and the mode locking method which is used, ultra-short pulses of very high average power can be generated without active stabilisation. Above all, with the increase of the output power no deterioration of the stability of the laser can be observed.

The laser emitted pulses of both high average power and short duration. With the mode locking method which is used, the output magnitudes of the laser system can even be optimised independently of each other. As can be seen from the data and the figures, the presented device is above all robust against large changes of the parameters of the resonator and the power.

To test the computer estimate which is explained above, a polarisation beam divider and a λ/2 plate were inserted into the coupled resonator 6 between lens 34 and mirror 10. Thus by turning the linear polarisation using the λ/2 plate, part of the light could be extracted at the polarisation beam divider, so that defined additional losses could be introduced into the coupled resonator.

A stability measurement was then carried out for each of three different total losses. For intensity measurement, the laser radiation was steered onto a GaAsP photodiode, which is insensitive to the fundamental radiation of the laser. However, a signal was always generated by two-photon absorption when the laser was mode locked, and correspondingly ultra-short pulses with high peak power were present.

The results of these experiments are shown in FIGS. 5a–e. The breaks in the signal which can be seen in FIGS. 5a and 5b, at a time of approximately 10 s, are solely the result of calibrating the zero point by blocking the laser beam.

In FIG. 5a, no additional losses were introduced. With a transmission of the optical fibre in the single pass of $T_F=78\%$ and a degree of reflection of mirror 4 of R=97%, the result for this experiment was a total loss of $V_{total}=41\%$. The total losses are thus less than is required according to the estimated condition of 63%. As can be seen in FIG. 5a, the result is a constant signal of the diode. The laser shows stable mode-locked operation.

In FIG. 5b, the total losses are $V_{total}=59\%$. Additionally, 30% laser power was extracted by an additional introduced beam divider. The total losses of 59% are then near the estimated limit of 63%. The laser also works significantly less stably, as can be seen in FIG. 5b.

For the measurement which is shown in FIG. 5e, the losses have been increased again to 68%. The total losses in this case are greater than the estimated limit. As the result, it can also be clearly seen in FIG. 5c that the laser now works very unstably. The laser is only mode-locked in short intervals (maximum signal in FIG. 5c), and emitted continuously between them (no signal in FIG. 5c). The laser switches continually between these states. The operating state of FIG. 5e thus corresponds to such conditions as are known from previous publications and patent specifications for free-running, not actively stabilised APM lasers.

Indicating the limit of total losses in the coupled resonator according to the previous estimate is thus suitable for defining the mode locking method which is used well.

In the embodiment of FIG. 2, the medium for the non-linear phase shift is a polarisation-containing single-mode optical fibre of length L=70 cm. However, it is also possible to use fibres of other lengths, without the method of functioning of the device which is shown being affected. In the test construction described above, for instance, fibres of length 40, 50, 60 and 100 cm were used, without having to accept disadvantages. Fibres with which the optical length of the coupled non-linear resonator equals the length of the main resonator, that is of which the length does not correspond to an integer multiple of the latter, are particularly advantageous. More compact, stable constructions can then be implemented. In relation to the embodiment of FIG. 2 (repetition rate 160 MHz), this applies in particular to fibre lengths ≦50 cm.

To reduce the losses in the coupled resonator and increase the fineness, the fibre ends can also be given an anti-reflection coating.

Instead of the lens 34 and mirror 10 as in FIG. 2, the fibre end can be mirrored directly. In this way an even lower loss is obtained, and the fineness of the coupled resonator and thus the optical stability of the system are increased.

It is also possible to use fibres which do not contain polarisation, but the system is then more sensitive to external disturbance, and the stability is less. The reason is changes of the polarisation direction, depending on external conditions of the fibre, such as their position or bending radius, after the pulse has passed through the fibre. Such conditions can cause a modulation of the amplitude, above all because the Nd:YVO$_4$ crystal emits in polarised form, and therefore amplifies a fixed polarisation direction preferentially.

In addition to the use of an optical fibre, waveguides on planar structures, such as are used in integrated optics, can be used. The result is further applications of the method, because materials with greater non-linear index of refraction can also be used. In comparison with an optical fibre, this would result in shorter lengths of the waveguides, so that more compact systems and even higher repetition rates become possible.

For high powers in the resonator, volume materials can also be used. Then, for instance, elements for coupling the laser light into the non-linear medium 12, such as the lens 32, can be omitted, resulting in significantly reduced losses. Media which work under the Brewster angle are particularly suitable for this. Additionally, the number of media which can be used is increased, giving a further adjustment and/or optimisation of the output data of the laser.

The method can be used even if amplification media other than Nd:YVO$_4$ are used, because the pulse generation is caused by the non-resonant, non-linear medium, which is independent of the amplification medium. As examples, neodymium-doped crystals in various host lattices, such as Nd:YLF, Nd:YAG, Nd:YVO$_4$, Nd:GVO$_4$, Nd:YPO$_4$, Nd:BEL, Nd:YALO, Nd:LSB, should be mentioned.

As well as the laser crystals which are doped with Nd, crystals which are doped with, for instance, other rare earth ions can be used. Also, mode locking and pulse shortening should be possible in configurations which use other laser transitions in these laser media. As well as the laser transition of the neodymium ion at 1.064 µm which is used in the embodiment, the known laser transitions around 1.3 µm and 900 nm can preferably also be excited. Mode locking using laser crystals which are doped with ions of the transition metals is also possible. Such laser crystals, which can be tuned over a wider wavelength range, are for instance Ti:sapphire, Cr:LiSaF and Cr:LiCaF.

The method is not restricted to a specific resonator configuration. In particular, there is also the possibility of achieving mode locking with resonators of greater or less length, i.e. lower or higher repetition rate. A special advantage resulting from a higher repetition rate is, among other things, the smaller structural length of such a system.

In the embodiment, the ratio of the lengths of the main and coupled resonators was 1:2. Other integer length ratios of the two resonators are also possible. For instance, a ratio of 2:3 is suitable.

This method is also not limited to the longitudinal pump arrangement of the laser diodes which is shown in the embodiments. A transverse arrangement of the laser diodes is also possible. The laser crystal is excited laterally by the laser diodes. This transverse pumping is particularly advantageous if the spatial beam quality of the laser diodes which are used is low, as with high-powered laser diode bars or if the laser crystal has a large absorption length. Lamp-pumped systems are also easily possible.

Increasing the power with this method is also possible. A configuration which, for instance, includes several laser crystals in the resonator can be chosen for this purpose. Higher pump powers of the laser diodes are also possible.

To shorten the pulses further, the known methods of compensation for different group speeds within the pulse, known as GVD compensation, can be applied. For this purpose, suitable optical components such as compensation prisms, Gires-Tournois interferometers, compensation lattices or special dielectric laser mirrors can be inserted. These mirrors are known as "chirp mirror" or "GTI mirror". With these mirrors, the different penetration depths of the various frequency portions within a pulse into the dielectric mirror layer result in the desired compensation of group speeds and thus a further reduction of the pulse duration.

Use of a non-linear resonator which is coupled in the way which is presented here can also be combined with the previously known methods of mode locking, e.g. acousto-optical and electro-optical modulation, or use of a saturable semiconductor absorber. This contributes to a further shortening of the generated pulses.

These explanations show that there are numerous possibilities for optimising the presented devices for various fields of application and output parameters, such as power and pulse length. However, the discussed changes always allow high robustness and stability, provided that they conform to the criteria according to the invention.

What is claimed is:

1. Device to generate laser light comprising:
   a laser-active main resonator and a coupled non-linear resonator, each of the two resonators being delimited by mirrors and one mirror of the main resonator being identical to a mirror of the coupled non-linear resonator,
   wherein the non-linear resonator has a power loss less than 63% of the power which is coupled via the main resonator and the mirror which delimits the coupled non-linear resonator, and the laser-active main resonator has in laser operation a threshold pump power which is less than one fifth of the used pump power by which this resonator is excited.

2. Device according to claim 1, wherein the laser active main resonator has in laser operation a threshold pump power which is less than one tenth of the used pump power by which the laser active main resonator is excited.

3. Device according to claim 1, wherein the mirror which delimits both the main resonator and the non-linear resonator has a transmission which is less than half of the transmission of the extraction mirror of the main resonator.

4. Device according to claim 1, wherein the mirror which delimits both the main resonator and the non-linear resonator has a transmission which is less than one third of the transmission of the extraction mirror of the main resonator.

5. Device according to claim 1, wherein the mirror which delimits both the main resonator and the non-linear resonator has a transmission less than or equal to 5%.

6. Device according to claim 1, wherein the non-linear resonator has a medium with a non-linear index of refraction.

7. Device according to claim 6, wherein the medium with non-linear index of refraction is at least partly in the form of the core of an optical fibre.

8. Device according to claim 7, wherein at least one end of the optical fibre has an anti-reflections coating.

9. Device according to claim 7, wherein a mirror which delimits the non-linear resonator is in the form of a mirrored end surface of the optical fibre.

10. Device according to claim 9, wherein the mirror which delimits the non-linear resonator and is opposite the mirror which is identical to that of the main resonator is in the form of a mirrored end surface of the optical fibre.

11. Device according to claim 7, wherein a lens for coupling light into the optical fibre is provided, and one side of it is mirrored as a mirror for.

12. Device according to claim 1, wherein a mirror which delimits the non-linear resonator, and is not identical to the mirror of the main resonator has a surface which is curved concavely in the direction of the interior of the resonator, and the focal distance of which is less than three times the resonator length of the non-linear resonator.

13. Device according to claim 1, wherein a mirror which delimits the non-linear resonator and is not identical to the mirror of the main resonator has a surface which is curved concavely in the direction of the interior of the resonator and the focal distance of which is less than twice the resonator length of the non-linear resonator.

14. Device according to claim 1, further comprising:
   further mirrors provided to fold the light path, at least one of the further mirrors being provided to couple in the pump light, said further mirrors being positioned between the outer mirrors of the main resonator or the non-linear resonator.

15. Device according to claim 1, wherein main resonator is in a form with a lasing medium between the mirrors as a laser, for which two optical elements with a curvature and a gap to the lasing medium are provided, on which basis the laser radiation can be emitted with a diffraction measuring number $M^2<2$.

16. Device according to claim 1, wherein the main resonator is in a form with a lasing medium between the mirrors as a laser, for which two mirrors with a curvature and a gap to the lasing medium are provided, on which basis the laser radiation can be emitted with a diffraction measuring number $M^2<2$.

17. Device according to claim 3, wherein the mirror which delimits both the main resonator and the non-linear resonator has a transmission less than or equal to 5%.

18. Device according to claim 5, wherein the non-linear resonator has a medium with a non-linear index of refraction.

19. Device according to claim 8, wherein a mirror which delimits the non-linear resonator is in the form of a mirrored end surface of the optical fibre.

20. Device according to claim 10, wherein a lens for coupling light into the optical fibre is provided, and one side of it is mirrored as a mirror for the main resonator.

21. Device according to claim 11, wherein a mirror which delimits the non-linear resonator, and is not identical to the mirror of the main resonator, has a surface which is curved concavely in the direction of the interior of the resonator, and the focal distance of which is less than three times the resonator length of the non-linear resonator.

22. Device according to claim 11, wherein a mirror which delimits the non-linear resonator, and is not identical to the mirror of the main resonator, has a surface which is curved concavely in the direction of the interior of the resonator, and the focal distance of which is less than twice the resonator length of the non-linear resonator.

23. Device according to claim 12, further comprising:
   further mirrors provided to fold the light path, at least one of the further mirrors being provided to couple in the pump light, said further mirrors being position between the outer mirrors of the main resonator or non-linear resonator.

24. Device according to claim 14, wherein the main resonator is in a form with a lasing medium between the mirrors as a laser, for which two optical elements with a curvature and a gap to the lasing medium are provided, on which basis the laser radiation can be emitted with a diffraction measuring number $M^2<2$.

25. Device according to claim 14, wherein the main resonator is in a form with a lasing medium between the mirrors as a laser, for which two mirrors with a curvature and a gap to the lasing medium are provided, on which basis the laser radiation can be emitted with a diffraction measuring number $M^2<2$.

* * * * *